(12) United States Patent
Sakurai

(10) Patent No.: US 7,760,194 B2
(45) Date of Patent: Jul. 20, 2010

(54) ULTRASONIC COORDINATE INPUT APPARATUS AND METHOD

(75) Inventor: Satoshi Sakurai, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 813 days.

(21) Appl. No.: 10/851,229

(22) Filed: May 24, 2004

(65) Prior Publication Data

US 2004/0239651 A1     Dec. 2, 2004

(30) Foreign Application Priority Data

May 27, 2003  (JP) ............................. 2003-149054

(51) Int. Cl.
*G06F 3/043* (2006.01)
(52) U.S. Cl. .................. 345/177; 178/18.04; 178/19.02
(58) Field of Classification Search ... 178/18.01–19.07; 345/177–179
See application file for complete search history.

(56) References Cited

U.S. PATENT DOCUMENTS

| | | | | |
|---|---|---|---|---|
| 4,506,354 A * | 3/1985 | Hansen | ................ | 367/101 |
| 4,673,228 A * | 6/1987 | Ditzig | ................ | 439/21 |
| 4,758,691 A * | 7/1988 | De Bruyne | ................ | 178/18.09 |
| 4,777,329 A * | 10/1988 | Mallicoat | ................ | 178/19.02 |
| 4,814,552 A * | 3/1989 | Stefik et al. | ................ | 178/19.02 |
| 4,888,565 A * | 12/1989 | Littleford et al. | ................ | 331/25 |
| 5,073,685 A * | 12/1991 | Kobayashi et al. | ....... | 178/19.02 |
| 5,308,936 A * | 5/1994 | Biggs et al. | ................ | 178/19.02 |
| 5,517,579 A * | 5/1996 | Baron et al. | ................ | 382/187 |
| 5,637,839 A * | 6/1997 | Yamaguchi et al. | ....... | 178/18.04 |
| 5,977,957 A * | 11/1999 | Miller et al. | ................ | 345/174 |
| 5,977,958 A * | 11/1999 | Baron et al. | ................ | 345/179 |
| 6,104,387 A * | 8/2000 | Chery et al. | ................ | 345/179 |
| 6,141,293 A * | 10/2000 | Amorai-Moriya et al. | ... | 367/127 |
| 6,225,986 B1 * | 5/2001 | Sato et al. | ................ | 345/178 |
| 6,278,445 B1 * | 8/2001 | Tanaka et al. | ................ | 345/178 |
| 6,288,711 B1 * | 9/2001 | Tanaka et al. | ................ | 345/179 |
| 6,414,673 B1 * | 7/2002 | Wood et al. | ................ | 345/173 |
| 6,535,206 B1 * | 3/2003 | Xu | ................ | 345/179 |
| 6,577,299 B1 * | 6/2003 | Schiller et al. | ................ | 345/179 |
| 6,587,098 B2 * | 7/2003 | Teterwak | ................ | 345/173 |
| 6,630,929 B1 * | 10/2003 | Adler et al. | ................ | 345/177 |
| 6,703,570 B1 * | 3/2004 | Russell et al. | ............ | 178/19.03 |
| 6,717,073 B2 * | 4/2004 | Xu et al. | ................ | 178/18.04 |
| 6,798,403 B2 * | 9/2004 | Kitada et al. | ................ | 345/173 |

FOREIGN PATENT DOCUMENTS

| | | |
|---|---|---|
| JP | 10-111117 | 4/1998 |
| JP | 11-15592 | 1/1999 |
| JP | 2000-132682 | 5/2000 |
| JP | 2002-373053 | 12/2002 |

* cited by examiner

*Primary Examiner*—Bipin Shalwala
*Assistant Examiner*—Steven E Holton
(74) *Attorney, Agent, or Firm*—Staas & Halsey LLP

(57) ABSTRACT

An ultrasonic coordinate input apparatus includes: a transmitter that transmits ultrasonic wave; and a receiver that has a function of detecting a position indicated by the transmitter, based on an ultrasonic signal received from the transmitter, while synchronizing with the transmitter. In this ultrasonic coordinate input apparatus, the transmitter is connected to the receiver with a communication line that enables bi-directional communication between the transmitter and the receiver.

5 Claims, 20 Drawing Sheets

Q1

Q2

Q3

ULTRASONIC COORDINATE INPUT APPARATUS AND METHOD

BACKGROUND OF THE INVENTION

1. Field of the Invention

The present invention relates to ultrasonic coordinate input apparatuses and ultrasonic coordinate input methods.

2. Description of the Related Art

Coordinate input apparatuses utilizing ultrasonic wave have already been developed. FIG. 1 illustrates an ultrasonic coordinate input apparatus disclosed in Japanese Unexamined Patent Publication No. 2002-373053 (hereinafter referred to as Patent Document 1). FIG. 1 shows the back face 16 of the screen of a terminal 1 in a closed state. In the structure illustrated in FIG. 1, an ultrasonic receiver 2A and an ultrasonic receiver 2B receive ultrasonic wave generated from a pen 4. A paper sheet 6 is placed on the back face 16, and writing is carried out on the paper sheet 6 with the pen 4. A paper holder 18 is to secure the paper sheet 6 to the back face 16.

The operation of the conventional ultrasonic coordinate input apparatus will now be described. When the paper sheet 6 placed on the back face 16 is pressed with the pen 4 or a picture is drawn on the paper sheet 6 with the pen 4, ultrasonic wave and infrared rays are generated from the top end of the pen 4. The generated ultrasonic wave is detected by the ultrasonic receivers 2A and 2B, and the generated infrared rays are detected by an infrared PD 3 that is located in a predetermined position on the back face 16.

The time differences T1 and T2 between the detection of the infrared rays and the detection of the ultrasonic wave are then measured, and the position coordinates of the pen 4 are calculated from the time differences T1 and T2. This process is repeated at regular intervals, and the indicating position of the pen 4 or the location (coordinates) of a picture is read in every time this process is carried out. In this manner, the coordinates of the top end of the pen 4 can be detected every time a position is indicated or a picture is drawn with the pen 4 on the paper sheet 6 placed on the back face 16, with the screen of the terminal 1 being closed and the back face 16 facing the front.

Referring now to FIG. 2, another conventional ultrasonic coordinate input apparatus will be described. FIG. 2 is a block diagram illustrating the structure of the conventional ultrasonic coordinate input apparatus. Like the apparatus disclosed in Patent Document 1, the ultrasonic coordinate input apparatus 20 utilizes infrared rays as synchronization signals of ultrasonic outputs. As shown in FIG. 2, the ultrasonic coordinate input apparatus 20 includes a transmitter 30 and a receiver 40. Reference numeral 50 indicates a host computer such as a personal computer.

The transmitter 30 takes a form of a pen that is the same as the pen 4 shown in FIG. 1, for example. This transmitter 30 includes a power supply 31, a main processor 32, an infrared emitter circuit 33, and an ultrasonic generator circuit 34. The power supply 31 supplies power to the entire transmitter 30. The main processor 32 controls the entire transmitter 30 to drive the infrared emitter circuit 33 and the ultrasonic generator circuit 34. The infrared emitter circuit 33 emits infrared rays. The ultrasonic generator circuit 24 generates ultrasonic wave.

The receiver 40 is to receive ultrasonic wave generated from the transmitter 30. This receiver 40 includes an infrared receiver circuit 41, an ultrasonic receiver circuit 42, a main processor 43, a power supply 44, and a host interface circuit 45. The infrared receiver circuit 41 receives infrared rays emitted from the transmitter 30. The ultrasonic receiver circuits 42 receive ultrasonic wave generated from the transmitter 30. Although not shown in FIG. 2, another ultrasonic receiver circuit 42 is provided in the receiver 40, which is, there are two ultrasonic receiver circuits 42 in the receiver 40, like the ultrasonic coordinate input apparatus of Patent Document 1 having two ultrasonic receivers. The power supply 44 supplies power to the entire receiver 40.

Based on signals transmitted from the infrared receiver circuit 41 to the ultrasonic receiver circuit 42, the main processor 43 measures the time difference between the detection of infrared rays and the detection of ultrasonic wave. The main processor 43 then calculates the position coordinates of the transmitter 30 from the time difference, and outputs the location coordinates to the host computer 50 through the host interface circuit 45. In this manner, the location of the transmitter 30 is detected.

Japanese Unexamined Patent Publication No. 11-15592 (hereinafter referred to as Patent Document 2) discloses yet another conventional apparatus. In a position input apparatus disclosed in Patent Document 2, a vibratory pen is connected to a receiving unit with a cable. Power is supplied to the pen from the outside through the cable, while synchronization signals are transmitted from the pen to the receiving unit.

Japanese Unexamined Patent Publication No. 10-111117 (hereinafter referred to as Patent Document 3) discloses still another conventional apparatus. An ultrasonic digitizer disclosed in Patent Document 3 has a frequency switcher provided in the ultrasonic generator so as to select a frequency among different preset frequencies. With this structure, measurement can be carried out with high accuracy. Japanese Unexamined Patent Publication No. 2000-132682 (hereinafter referred to as Patent Document 4) discloses yet another conventional apparatus. In the apparatus disclosed in Patent Document 4, a vibratory pen is connected to a control circuit with a cable, and power is supplied to the pen from the control circuit through the cable.

However, there are problems with the ultrasonic coordinate input apparatus disclosed in Patent Document 1 and the conventional ultrasonic coordinate input apparatus shown in FIG. 2. In those apparatuses, infrared rays are used as trigger signals for notifying the receiver that ultrasonic wave is outputted from the transmitter. As infrared rays are easily affected by disturbing light such as sunlight, erroneous trigger signal detection is often caused on the receiver end. Also, with infrared rays, an infrared emitter circuit is required for the transmitter, and an infrared receiver circuit is required for the receiver. As a result, a large space for the circuits is needed, and the production cost becomes high.

So as to solve the above problems, Patent Document 2 discloses a technique of connecting a transmitter and a receiver with a cable so that trigger signals can be transmitted. However, the same amount of ultrasonic wave is outputted no matter where the transmitter is located. As a result, electric power is wasted.

In the ultrasonic coordinate input apparatus shown in FIG. 2, a battery is normally used for the power supply 31 of the transmitter 30. However, in a case where the battery voltage becomes lower than the operating voltage, the ultrasonic coordinate input apparatus 20 may become unusable.

So as to solve this problem, Patent Document 2 and Patent Document 4 each discloses a technique of not employing a power supply in the transmitter, and utilizing the power supply of the receiver to output ultrasonic wave from the transmitter. However, as the same amount of ultrasonic wave is outputted no manner where the transmitter is located, electric power is wasted, and control operations cannot be performed in accordance with the location of the transmitter.

SUMMARY OF THE INVENTION

It is therefore an object of the present invention to provide an ultrasonic coordinate input apparatus and an ultrasonic coordinate input method in which the above disadvantages are eliminated.

A more specific object of the present invention is to provide an ultrasonic coordinate input apparatus that can perform bi-directional communication between a transmitter and a receiver. Another specific object of the present invention is to provide an ultrasonic coordinate input apparatus and method that can adjust each ultrasonic output.

The above objects of the present invention are achieved by an ultrasonic coordinate input apparatus comprising: a transmitter that transmits an ultrasonic wave; and a receiver detecting a position indicated by the transmitter, based on an ultrasonic signal received from the transmitter, while synchronizing with the transmitter, the transmitter being connected to the receiver with a communication line that enables bi-directional communication between the transmitter and the receiver.

The above objects of the present invention are also achieved by an ultrasonic coordinate input apparatus comprising: a transmitter that transmits an ultrasonic wave; and a receiver detecting a position indicated by the transmitter, based on an ultrasonic signal received from the transmitter, while synchronizing with the transmitter, the receiver notifying the transmitter of a reception state of the ultrasonic wave received from the transmitter, and the transmitter including an output adjuster that adjusts ultrasonic output to be transmitted, in accordance with the reception state of the ultrasonic wave obtained from the notifying function.

The above objects of the present invention are also achieved by an ultrasonic coordinate input apparatus comprising: a transmitter that transmits a ultrasonic wave; and a receiver detecting a position indicated by the transmitter, based on an ultrasonic signal received from the transmitter, while synchronizing with the transmitter, the receiver including a transmission time calculator that calculates an ultrasonic wave transmission time required for receiving the ultrasonic wave from the transmitter, and the transmitter including an output adjuster that adjusts ultrasonic output to be transmitted, in accordance with the ultrasonic wave transmission time calculated by the transmission time calculator.

The above objects of the present invention are also achieved by an ultrasonic coordinate input apparatus comprising: a transmitter that transmits a ultrasonic wave; and a receiver that has a function of detecting a position indicated by the transmitter, based on an ultrasonic signal received from the transmitter, while synchronizing with the transmitter, the receiver including a transmission time calculator that calculates an ultrasonic wave transmission time required for receiving the ultrasonic wave from the transmitter, and the transmitter including a cycle adjuster that adjusts a cycle of transmitting the ultrasonic wave, in accordance with the ultrasonic wave transmission time calculated by the transmission time calculator.

The above objects of the present invention are also achieved by an ultrasonic coordinate input apparatus comprising: a transmitter that transmits a ultrasonic wave; and a receiver that has a function of detecting a position indicated by the transmitter, based on an ultrasonic signal received from the transmitter, while synchronizing with the transmitter, the receiver including an ultrasonic detector that detects the amplitude of the ultrasonic wave received from the transmitter, and the transmitter including an output adjuster that adjusts ultrasonic output to be transmitted, in accordance with the ultrasonic amplitude detected by the ultrasonic detector.

The above objects of the present invention are also achieved by an ultrasonic coordinate input method in which a position indicated by a transmitter that transmits ultrasonic wave is detected based on an ultrasonic signal received from the transmitter that is in synchronization with a receiver, the method comprising the steps of: calculating a transmission time of the ultrasonic wave received from the transmitter; and adjusting ultrasonic output to be transmitted from the transmitter, in accordance with the calculated ultrasonic wave transmission time.

The above objects of the present invention are also achieved by an ultrasonic coordinate input method in which a position indicated by a transmitter that transmits ultrasonic wave is detected based on an ultrasonic signal received from the transmitter that is in synchronization with a receiver, the method comprising the steps of: detecting the amplitude of the ultrasonic wave received from the transmitter; and adjusting ultrasonic output to be transmitted from the transmitter, in accordance with the detected ultrasonic amplitude.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

First Embodiment

Figure 1:
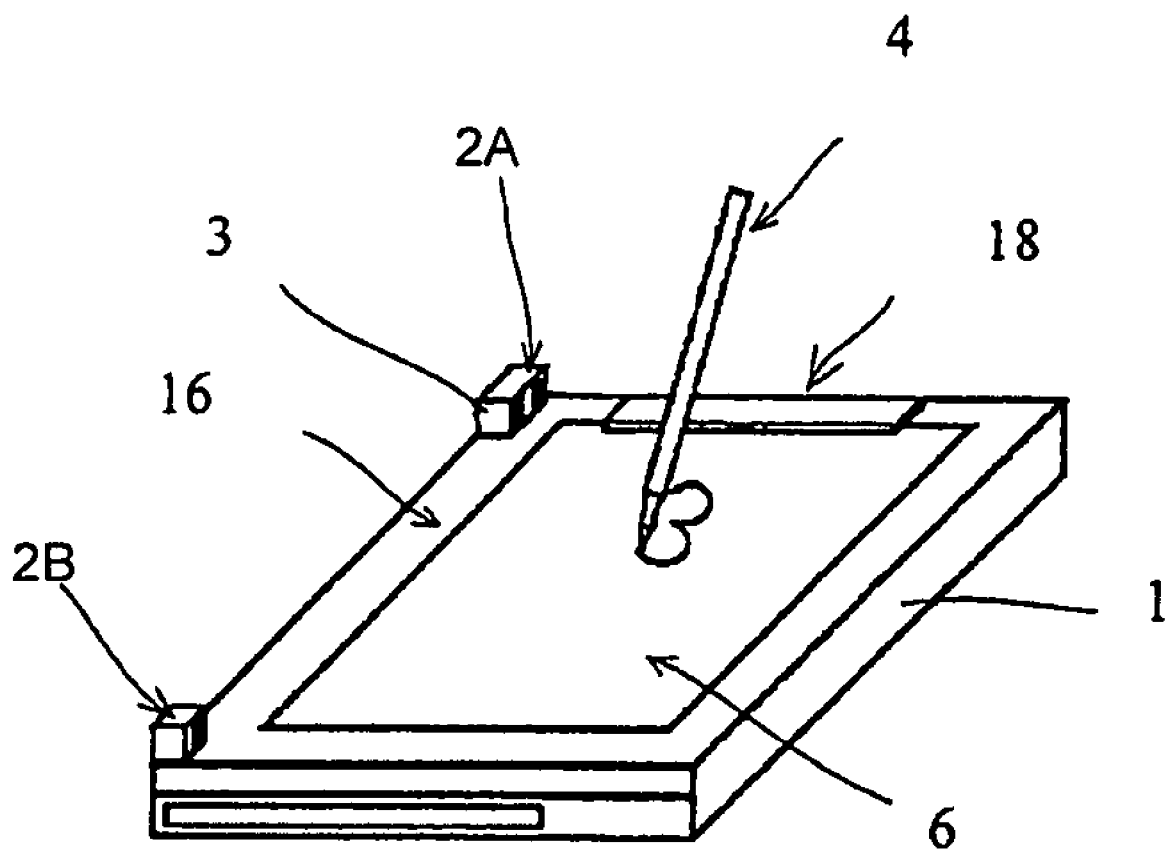
FIG. 1 illustrates a conventional ultrasonic coordinate input apparatus disclosed in Patent Document 1.
Figure 2:
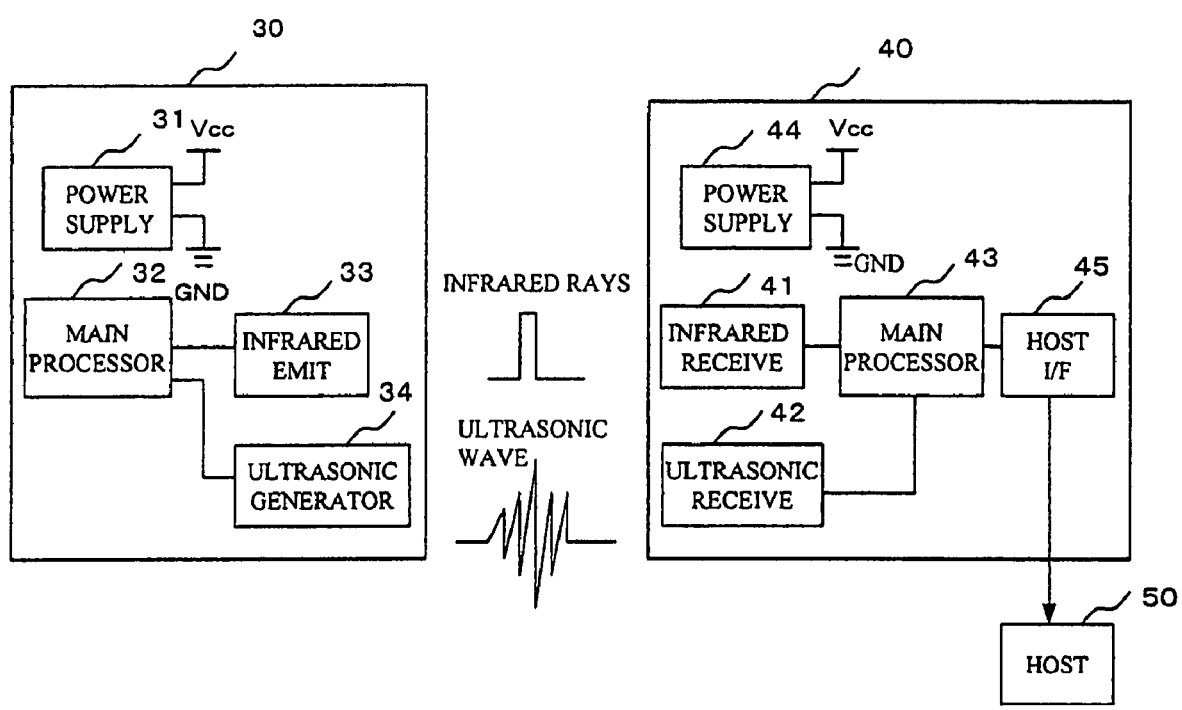
FIG. 2 is a block diagram illustrating another conventional ultrasonic coordinate input apparatus.
Figure 3:
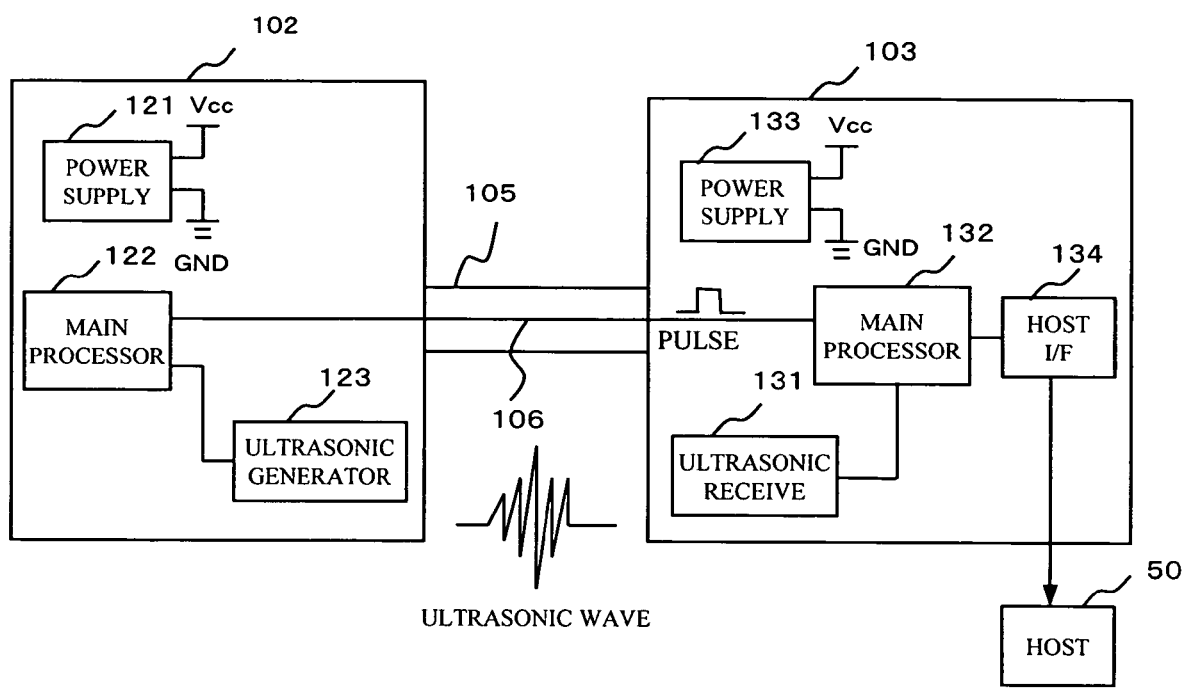
FIG. 3 is a block diagram illustrating an ultrasonic coordinate input apparatus in accordance with a first embodiment of the present invention.

The following is a description of an embodiment of the present invention. FIG. 3 is a block diagram illustrating an ultrasonic coordinate input apparatus in accordance with a first embodiment of the present invention. As shown in FIG. 3, the ultrasonic coordinate input apparatus 101 includes a transmitter 102 and a receiver 103. Reference numeral 50 indicates a host computer such as a personal computer.

The transmitter 102 and the receiver 103 are connected to each other with a cable 105. The cable 105 includes a signal line 106 for transmitting a synchronization signal of ultrasonic output. Based on the synchronization signal of ultrasonic output and an ultrasonic signal generated from the transmitter 102, the receiver 103 detects the position indicated by the transmitter 102. The transmitter 102 may take the form of a pen, for example. The transmitter 102 includes a power supply 121, a main processor 122, and an ultrasonic generator circuit 123.

The power supply 121 supplies power to the entire transmitter 103. The main processor 122 controls the ultrasonic generator circuit 123 to output ultrasonic wave at regular intervals. When the ultrasonic generator circuit 123 generates ultrasonic wave, the main processor 122 transmits a digital pulse as a synchronization signal of the ultrasonic output to a main processor 132 of the receiver 103 through the cable 105, thereby notifying the receiver 103 that ultrasonic wave has been generated.

Based on the output signal from the main processor 122, the ultrasonic generator circuit 123 outputs ultrasonic wave. The receiver 103 includes an ultrasonic receiver circuit 131, the main processor 132, a power supply 133, and a host interface circuit 134. The ultrasonic receiver circuit 131 receives the ultrasonic wave from the transmitter 102.

After the synchronization signal of the ultrasonic output from the transmitter 102 is received, the main processor 132 measures the time (represented by a counter value) required for the ultrasonic receiver circuit 131 to receive the ultrasonic wave, and detects the position indicated by the transmitter 102. The main processor 132 then transmits the indicated position to the host computer 50 through the host interface circuit 134. The power supply 133 supplies power to the entire receiver 103.

The operation of the ultrasonic coordinate input apparatus 101 in accordance with the first embodiment will now be described. When a user performs a predetermined operation with the pen-like transmitter 102, the main processor 122 controls the ultrasonic transmitter circuit 123 to output ultrasonic wave at regular intervals. When the ultrasonic transmitter circuit 123 outputs ultrasonic wave, the main processor 122 transmits a digital pulse as a synchronization signal of the ultrasonic output to the main processor 132 of the receiver 103 through the cable 105, thereby notifying the receiver 103 that the ultrasonic wave has been outputted.

The ultrasonic receiver circuit 131 of the receiver 103 receives the ultrasonic wave from the transmitter 102, and outputs the received ultrasonic signal to the main processor 132. After receiving a synchronization signal of the ultrasonic output from the transmitter 102, the main processor 132 measures the time (represented by a counter value) required for the ultrasonic receiver circuit 131 to receive the ultrasonic wave, and detects the position indicated by the transmitter 102.

The main processor 132 then transmits the detected position indicated by the transmitter 102 to the host computer 50 through the host interface circuit 134. Through this operation, the host computer 50 can recognize the position indicated by the transmitter 102.

In accordance with the first embodiment, instead of an infrared signal, a synchronization signal of ultrasonic output is used together with a cable. Accordingly, the synchronization signal of ultrasonic output can be dealt with as a digital signal transmitted through the cable 105. Thus, the infrared emitter circuit and infrared receiver circuits that are essential for the conventional apparatuses can be omitted. Also, accurate notification can be carried out, without adverse influence of disturbing light.

Second Embodiment

Figure 4:
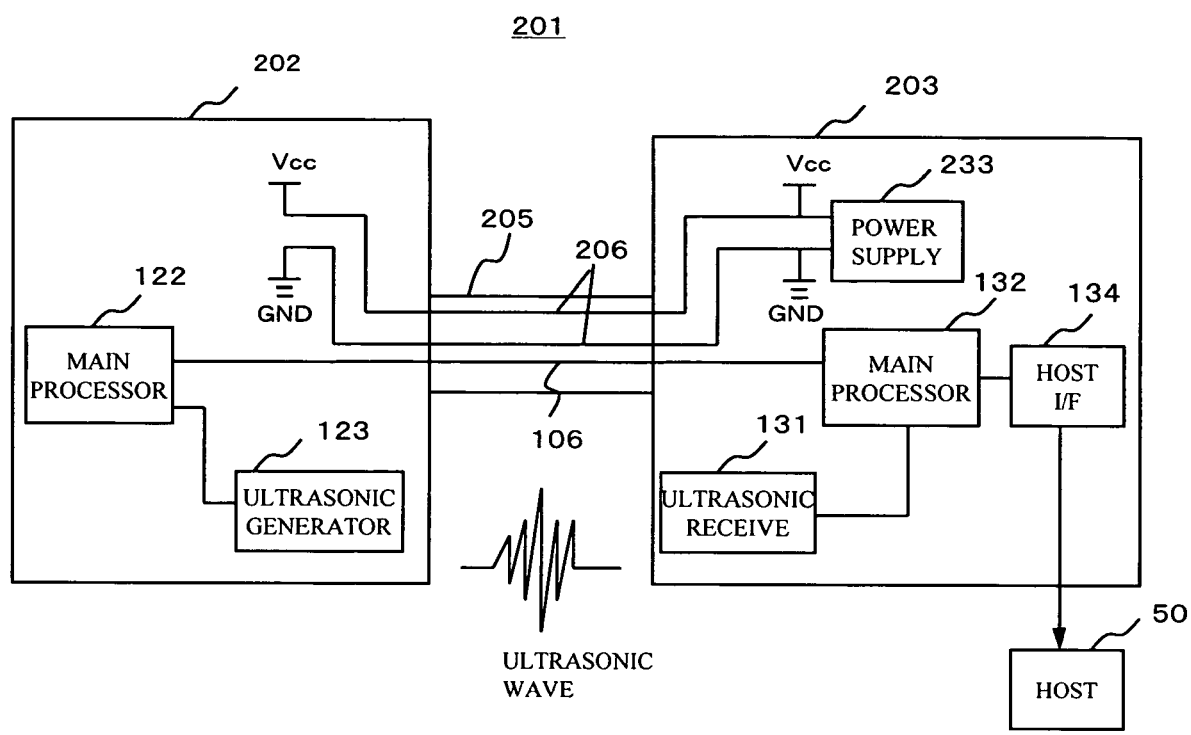
FIG. 4 is a block diagram illustrating an ultrasonic coordinate input apparatus in accordance with a second embodiment of the present invention.

FIG. 4 is a block diagram illustrating an ultrasonic coordinate input apparatus in accordance with a second embodiment of the present invention. As shown in FIG. 4, the ultrasonic coordinate input apparatus 201 in accordance with the second embodiment includes a transmitter 202 and a receiver 203. The transmitter 202 includes a main processor 122 and an ultrasonic generator circuit 123. The receiver 203 includes an ultrasonic receiver circuit 131, a main processor 132, a power supply 233, and a host interface circuit 134. In FIG. 4, the same components as those of the first embodiment are denoted by the same reference numerals as the corresponding ones of the first embodiment, and explanation of them is omitted herein.

A cable 205 that connects the transmitter 202 and the receiver 203 includes power supply lines 206 for supplying power to the transmitter 202, as well as the signal line 106 for transmitting synchronization signals of ultrasonic output. With the cable 205 of this structure, it is not necessary to employ a power source circuit in the transmitter 202.

In the ultrasonic coordinate input apparatus 201 in accordance with the second embodiment, the transmitter 202 is supplied with power from the power supply 233 of the receiver 203 through the power source lines 206. Accordingly, a power supply circuit that is essential for a conventional apparatus is not required. Thus, the production cost can be reduced.

Third Embodiment

Figure 5:
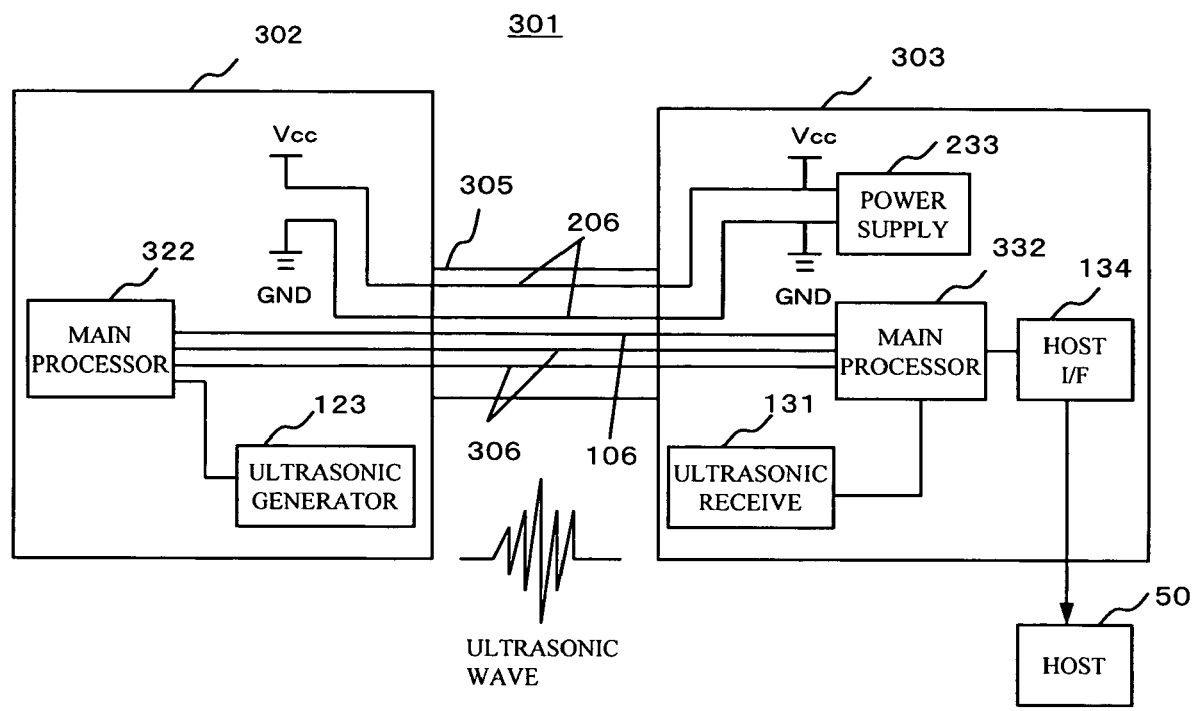
FIG. 5 is a block diagram illustrating an ultrasonic coordinate input apparatus in accordance with a third embodiment of the present invention.

FIG. 5 is a block diagram illustrating an ultrasonic coordinate input apparatus in accordance with a third embodiment of the present invention. As shown in FIG. 5, the ultrasonic coordinate input apparatus 301 includes a transmitter 302 and a receiver 303. The transmitter 302 includes a main processor 322 and an ultrasonic generator circuit 123. The receiver 303 includes an ultrasonic receiver circuit 131, a main processor 332, a power supply 233, and a host interface circuit 134. The transmitter 302 and the receiver 303 are connected to each other with a cable 305. In FIG. 5, the same components as those of the foregoing embodiments are denoted by the same reference numerals as the corresponding ones of the foregoing embodiments, and explanation of them is omitted herein.

In addition to the signal line 106 for transmitting synchronization signals of ultrasonic output and the power source lines 206, the cable 305 includes communication lines 306 for performing bi-directional communication between the main processor 322 of the transmitter 302 and the main processor 332 of the receiver 303. The communication lines 306 may include serial interface signal lines, for example.

As the transmitter 302 and the receiver 303 are connected to each other with the communication lines 306, bi-direction communication can be performed, and the following procedures can be carried out. In a case where the distance between the transmitter 302 and the receiver 303 is short, for example, an instruction to reduce ultrasonic output is issued from the receiver 303 to the transmitter 302, and the transmitter 302 outputs ultrasonic wave in accordance with the instruction.

In a case where the distance between the transmitter 302 and the receiver 303 is longer than a certain distance, an instruction to increase ultrasonic output is issued from the receiver 303 to the transmitter 302. In this manner, the amount of ultrasonic output can be controlled.

As described above, in the ultrasonic coordinate input apparatus 301 in accordance with the third embodiment, the transmitter 302 is connected to the receiver 303 through the communication lines 306. Thus, bi-directional communication can be performed between the transmitter 302 and the receiver 303.

Fourth Embodiment

Figure 6:
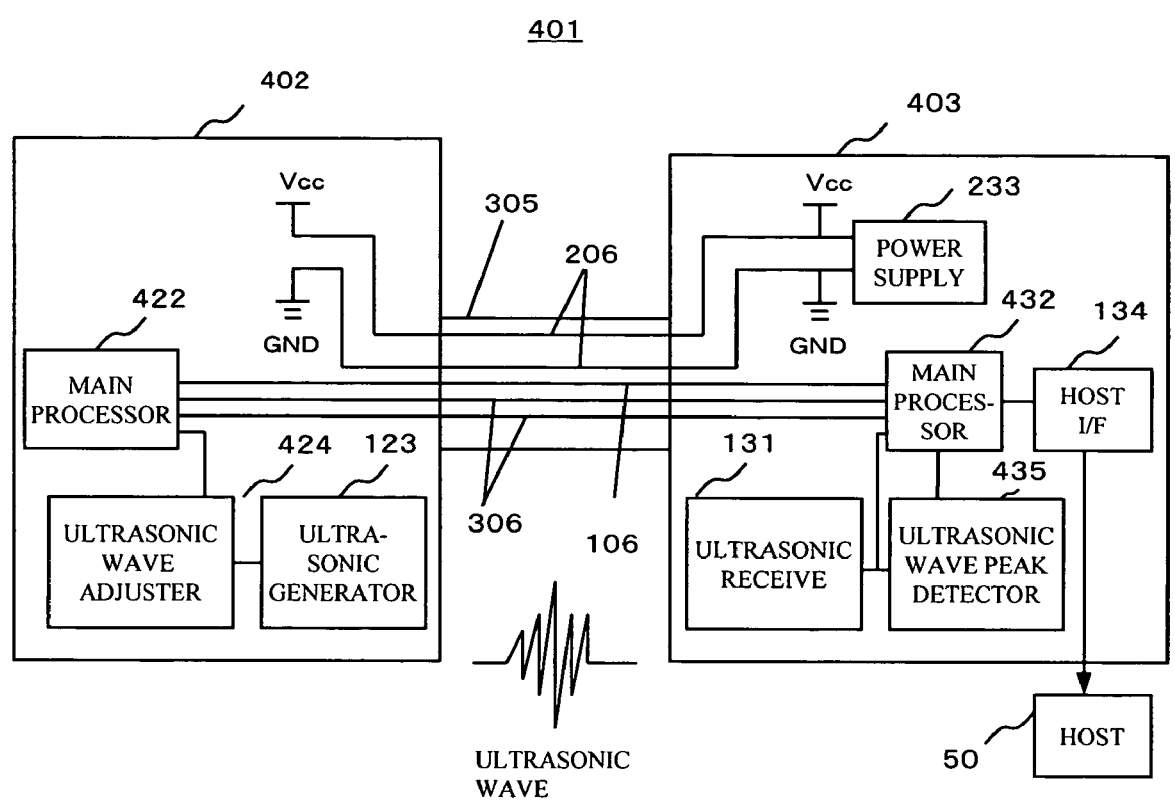
FIG. 6 is a block diagram illustrating an ultrasonic coordinate input apparatus in accordance with a fourth embodiment of the present invention.

FIG. 6 is a block diagram illustrating an ultrasonic coordinate input apparatus in accordance with a fourth embodiment of the present invention. The fourth embodiment is characterized by having a function of controlling the amount of ultrasonic output. The ultrasonic coordinate input apparatus 401 includes a transmitter 402 and a receiver 403. The transmitter 402 includes a main processor 422, an ultrasonic generator circuit 123, and an ultrasonic output adjuster circuit 424.

The receiver 403 includes an ultrasonic receiver circuit 131, a main processor 432, a power supply 233, a host interface circuit, and an ultrasonic peak detector circuit 435. The transmitter 402 and the receiver 403 are connected to each other with a cable 305. In FIG. 6, the same components as those of the foregoing embodiments are denoted by the same reference numerals as those corresponding ones of the foregoing embodiments, and explanation of them is omitted herein.

The transmitter 402 has the ultrasonic output adjuster circuit 424 for adjusting the ultrasonic output of the ultrasonic generator circuit 123. The receiver 403 has the ultrasonic peak detector circuit 435 for detecting the amplitude peak of the ultrasonic wave received by the ultrasonic receiver circuit 131. Based on the ultrasonic peak value S obtained by the ultrasonic peak detector circuit 435, the main processor 432 of the receiver 403 performs ultrasonic output control.

More specifically, in accordance with the ultrasonic amplitude detected by the main processor 432 through the ultrasonic peak detector circuit 435, the transmitter 402 adjusts the ultrasonic output to be transmitted from the ultrasonic generator circuit 123. Here, the main processor 422 may adjust the ultrasonic output to be transmitted from the ultrasonic generator circuit 123 in accordance with an ultrasonic amplitude pattern corresponding to the ultrasonic amplitude detected by the main processor 432 of the receiver 403. This procedure will be described later in detail.

Figure 7:
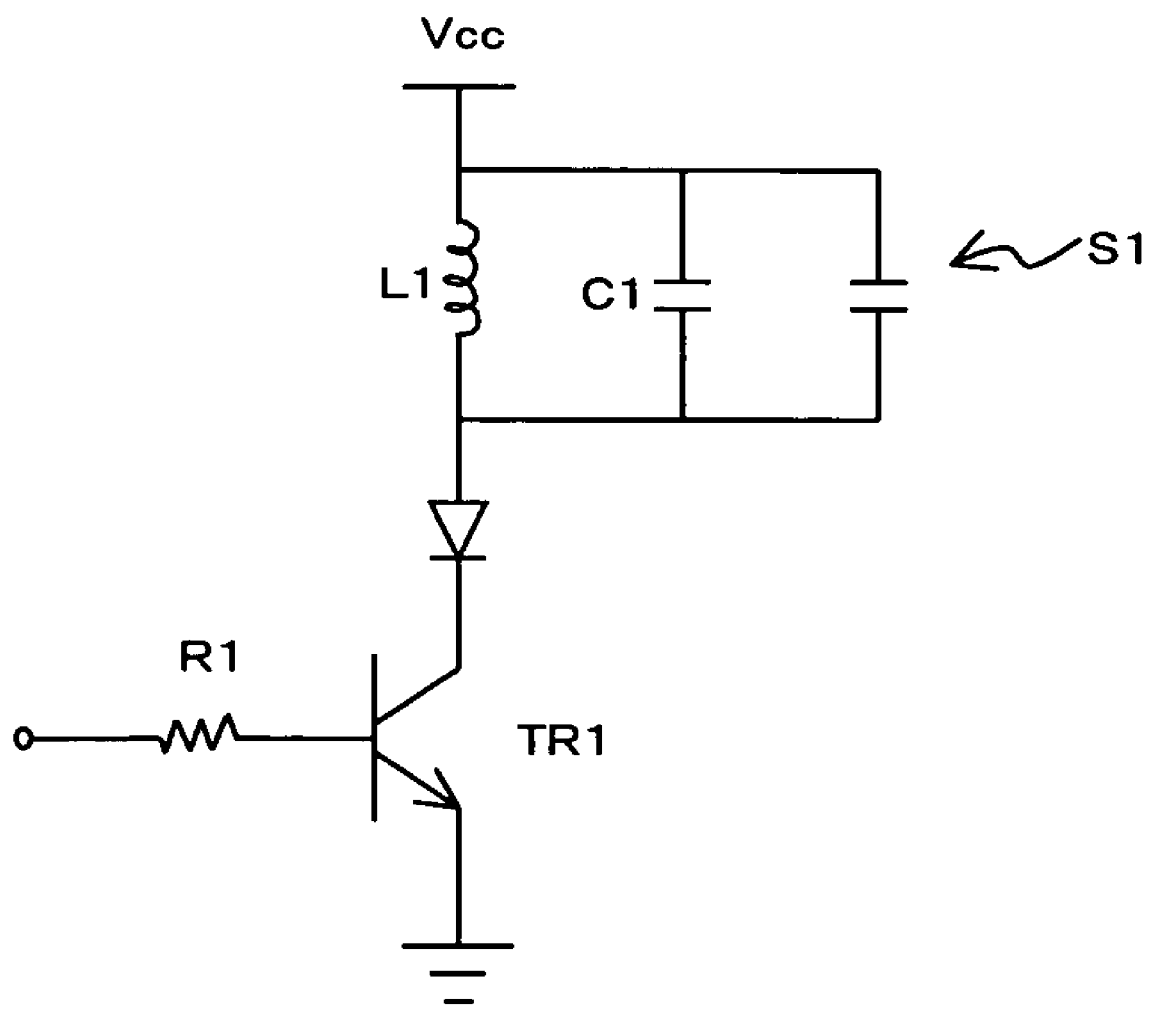
FIG. 7 is a circuit diagram illustrating the ultrasonic generator circuit of the ultrasonic coordinate input apparatus shown in FIG. 6.

The ultrasonic generator circuit 123 will now be described. FIG. 7 is a circuit diagram of the ultrasonic generator circuit 123. A transistor TR1 is used as a switch. When the transistor TR1 is on, current flows through an inductance L1, and the current increases with the inductance L1. When the transistor TR1 is turned off, back electromotive force is caused in the inductance L1, and current flowing in the opposite direction can be drawn from a capacitor C1. After that, resonance at a resonant frequency f is caused in a LC closed circuit. The resonant frequency f can be expressed as:

$$f = \frac{1}{2\pi\sqrt{LC}} \quad (1)$$

With the resonance, a piezoelectric film that is an ultrasonic sensor S1 vibrates and generates ultrasonic wave.

Figure 8:
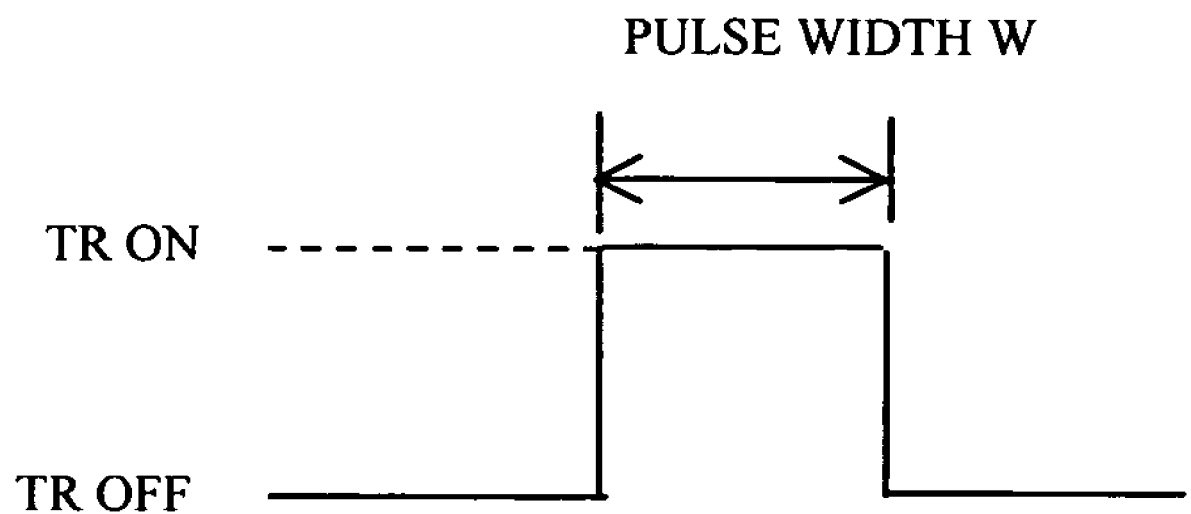
FIG. 8 shows a pulse to be inputted into the base of the transistor of the ultrasonic generator circuit shown in FIG. 7.

FIG. 8 shows the pulse to be inputted into the base of the transistor TR1. As shown in FIG. 8, the pulse width W is greater when the transistor TR1 is on for a longer period of time. As the pulse width W becomes greater, the back electromotive force generated in the inductance L1 increases. Accordingly, ultrasonic wave with greater amplitude is outputted.

The ultrasonic output adjuster circuit 424 shown in FIG. 6 sets the pulse width W to be provided to the transistor TR1. When ultrasonic output values are P1, P2, and P3, the ultrasonic output adjuster circuit 424 sets pulse widths W1, W2, and W3, as will be described later. The relationship among those pulse widths is expressed as: W1<W2<W3.

Figure 9:
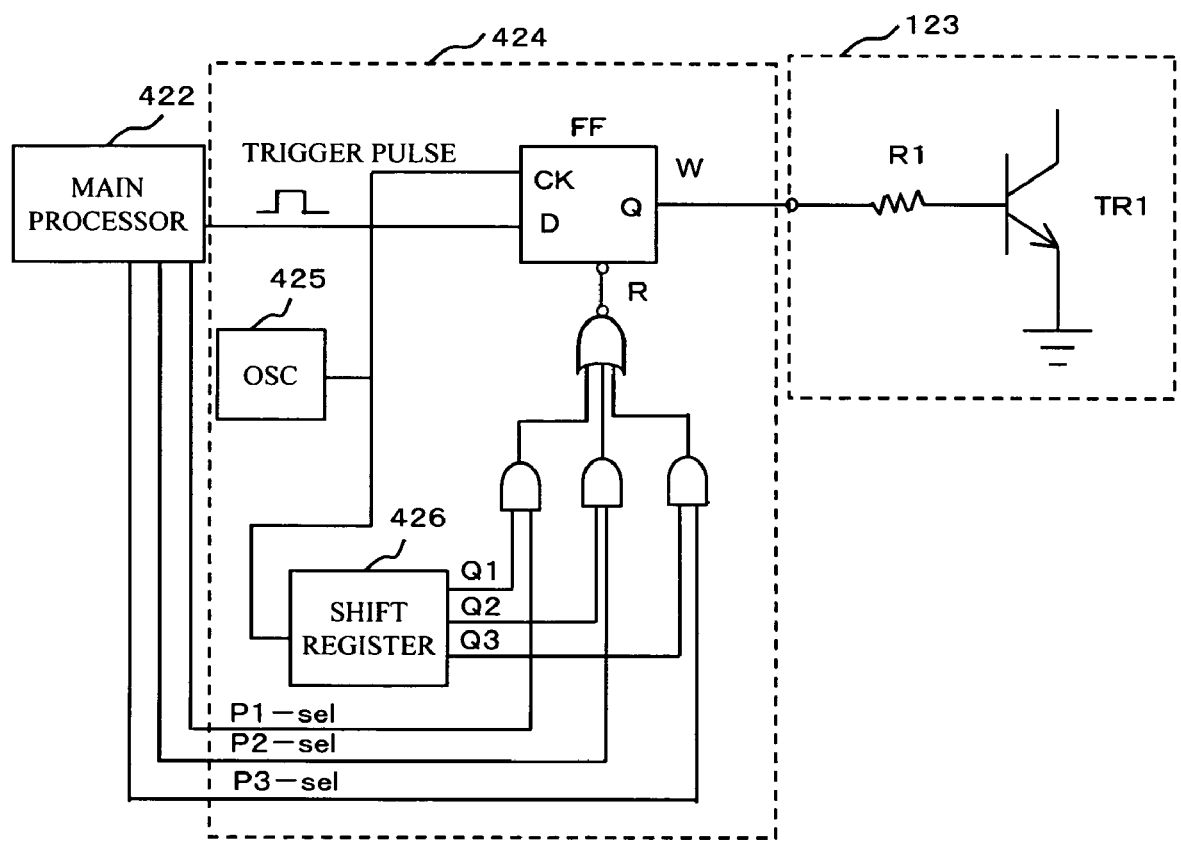
FIG. 9 illustrates the ultrasonic output adjuster circuit of the ultrasonic coordinate input apparatus shown in FIG. 6.

Referring now to FIG. 9, the ultrasonic output adjuster circuit 424 will be described. FIG. 9 illustrates the ultrasonic output adjuster circuit 424. As described above, the ultrasonic output adjuster circuit 424 sets pulse widths. In FIG. 9, reference numeral 422 indicates the main processor, reference numeral 123 indicates the ultrasonic generator circuit, and reference numeral 424 indicates the ultrasonic output adjuster circuit.

The ultrasonic output adjuster circuit 424 includes an oscillator 425, a shift register 426, a flip-flop FF, an AND circuit, and an OR circuit. An I/O terminal for the main processor 422 is prepared for each of the ultrasonic output values (P1, P2, and P3, for example). When the ultrasonic output value P is P1, the main processor 422 sets the P1-cell to high level.

Figure 10:
FIG. 10 shows output pulses generated from the flip-flop of the ultrasonic output adjuster circuit shown in FIG. 9.
Figure 10:
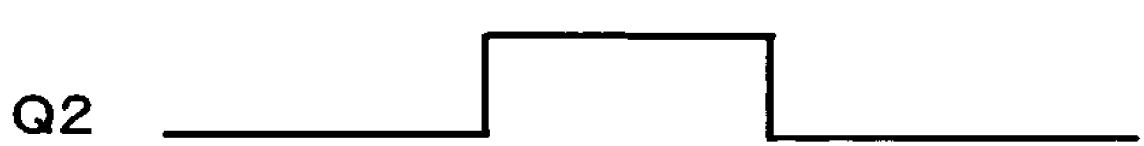
Figure 10:

FIG. 10 shows pulses outputted from the shift register 426. When an activating pulse is outputted from the main processor 422, the output Q of the flip-flop FF switches to high level. After that, the timing of resetting the flip-flop FF is determined from the output timing of the shift register output (Q1, Q2, and Q3). The timing of the flip-flop output Q switching to low level varies among the P1-cell, the P2-cell, and the P3-cell.

The timing of switching on the transistor TR1 of the ultrasonic generator circuit 123 is determined from the output Q of the flip-flop FF. In a case where the main processor 422 determines the pulse widths W to be provided to the transistor TR1, the circuit shown in FIG. 9 is not required before the transistor TR1.

Figure 11:
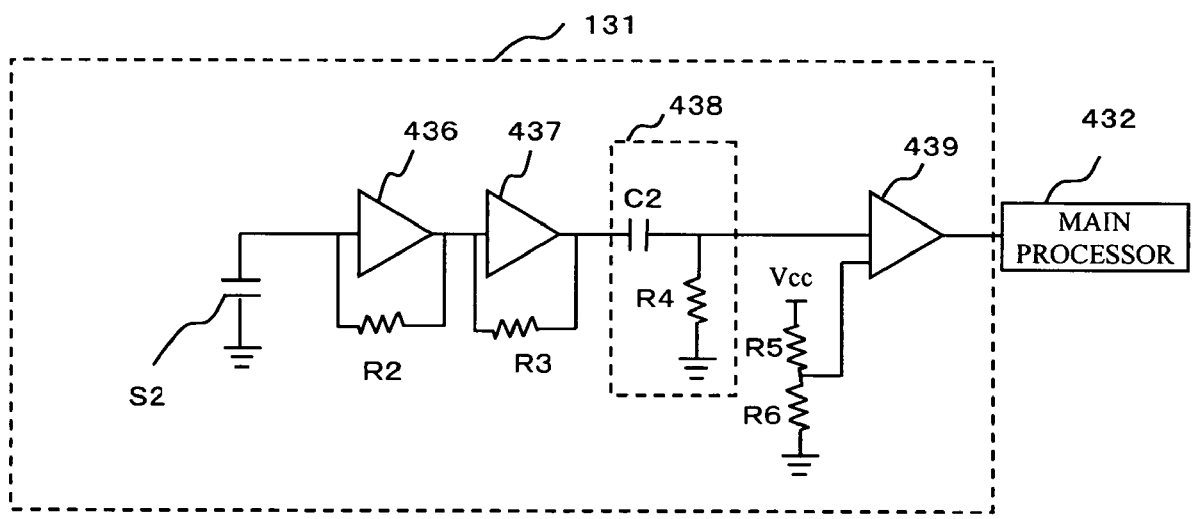
FIG. 11 illustrates the ultrasonic receiver circuit of the ultrasonic coordinate input apparatus shown in FIG. 6.

Referring now to FIG. 11, the ultrasonic receiver circuit 131 of the receiver 403 shown in FIG. 6 will be described. FIG. 11 illustrates the ultrasonic receiver circuit 131. In FIG. 11, reference numeral 131 indicates the ultrasonic receiver circuit, and reference numeral 432 indicates the main processor. The ultrasonic receiver circuit 131 includes an ultrasonic wave sensor S2, amplifiers (AMP) 436 and 437, a high pass filter (HPF) 438, a comparator 439, and resistor elements R2, R3, R5, and R6. The high pass filter 438 includes a resistor element R4 and a capacitor C2. The ultrasonic wave sensor S2 is a piezoelectric film.

The amplifiers 436 and 437 amplify the vibration of the ultrasonic wave sensor S2. The high pass filter 438 then cuts the low frequency components off, and the comparator 439 performs digitizing. As a result, the main processor 432 obtains an ultrasonic signal corresponding to the received ultrasonic wave.

Figure 12:
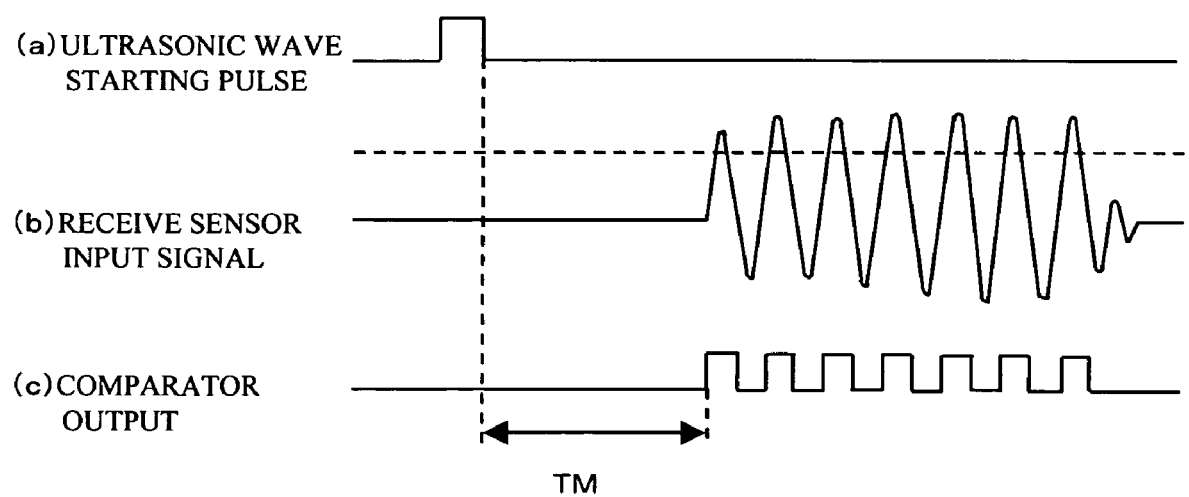
FIG. 12 illustrates a method of measuring an ultrasonic wave transmission time.

Referring now to FIG. 12, the method of measuring an ultrasonic wave transmission time will be described. FIG. 12 illustrates the method of measuring an ultrasonic wave transmission time. The main processor 432 obtains a synchronization signal of ultrasonic output, which is the ultrasonic starting pulse shown as "(a)" in FIG. 12, from the main processor 422 of the transmitter 402. The main processor 432 then starts measuring an ultrasonic wave transmission time.

In FIG. 12, "(a)" indicates the threshold value of the comparator 439, "(b)" indicates an input signal that has been received by the ultrasonic wave sensor S2, has been amplified by the amplifiers 436 and 437, and has the low frequency components cut off. The input signal is inputted into the comparator 439, which then compares the input signal with a reference voltage. As a result, a digitized pulse signal indicated by "(c)" in FIG. 12 is outputted from the output terminal of the comparator 439.

Upon receipt of the pulse signal, the main processor 432 measures the ultrasonic wave transmission time TM, based on the ultrasonic starting pulse indicated by "(a)" in FIG. 12 and the pulse signal indicated by "(c)" in FIG. 12. By measuring the time required to detect the digitized pulse signal, the main processor 432 measures the ultrasonic wave transmission time TM.

Figure 13:
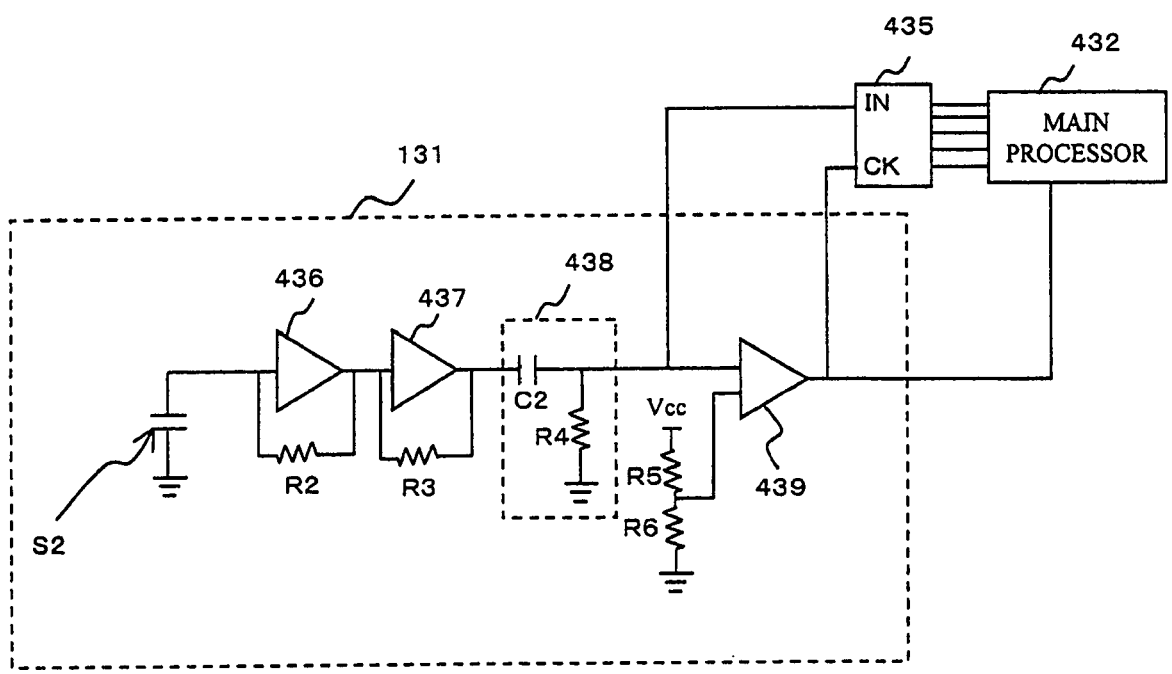
FIG. 13 illustrates the ultrasonic peak detector circuit of the ultrasonic coordinate input apparatus shown in FIG. 6.

FIG. 13 illustrates the ultrasonic peak detector circuit 435 of the receiver 403. In FIG. 13, reference numeral 131 indicates the ultrasonic receiver circuit, reference numeral 432 indicates the main processor, and reference numeral 435 indicates the ultrasonic peak detector circuit. In this embodiment, the ultrasonic peak detector circuit 435 is an A-D converter. The main processor 432 receives information from the A-D converter that is the ultrasonic peak detector circuit 435. As for the ultrasonic receiver circuit 131, the structure is the same as the structure shown in FIG. 11, and therefore, explanation of it is omitted herein.

In the ultrasonic receiver circuit 131, a signal received by the ultrasonic wave sensor S2 is amplified by the amplifiers 436 and 437, and the amplified analog signal is digitized by the comparator 439. The ultrasonic peak detector circuit 435 performs A-D conversion on each digital pulse outputted from the comparator 439. The main processor 432 receives digital signals, which have been A-D converted in the same timing, from the ultrasonic peak detector circuit 435, and calculates the level at which the signal value becomes the highest (the peak value).

Figure 14:
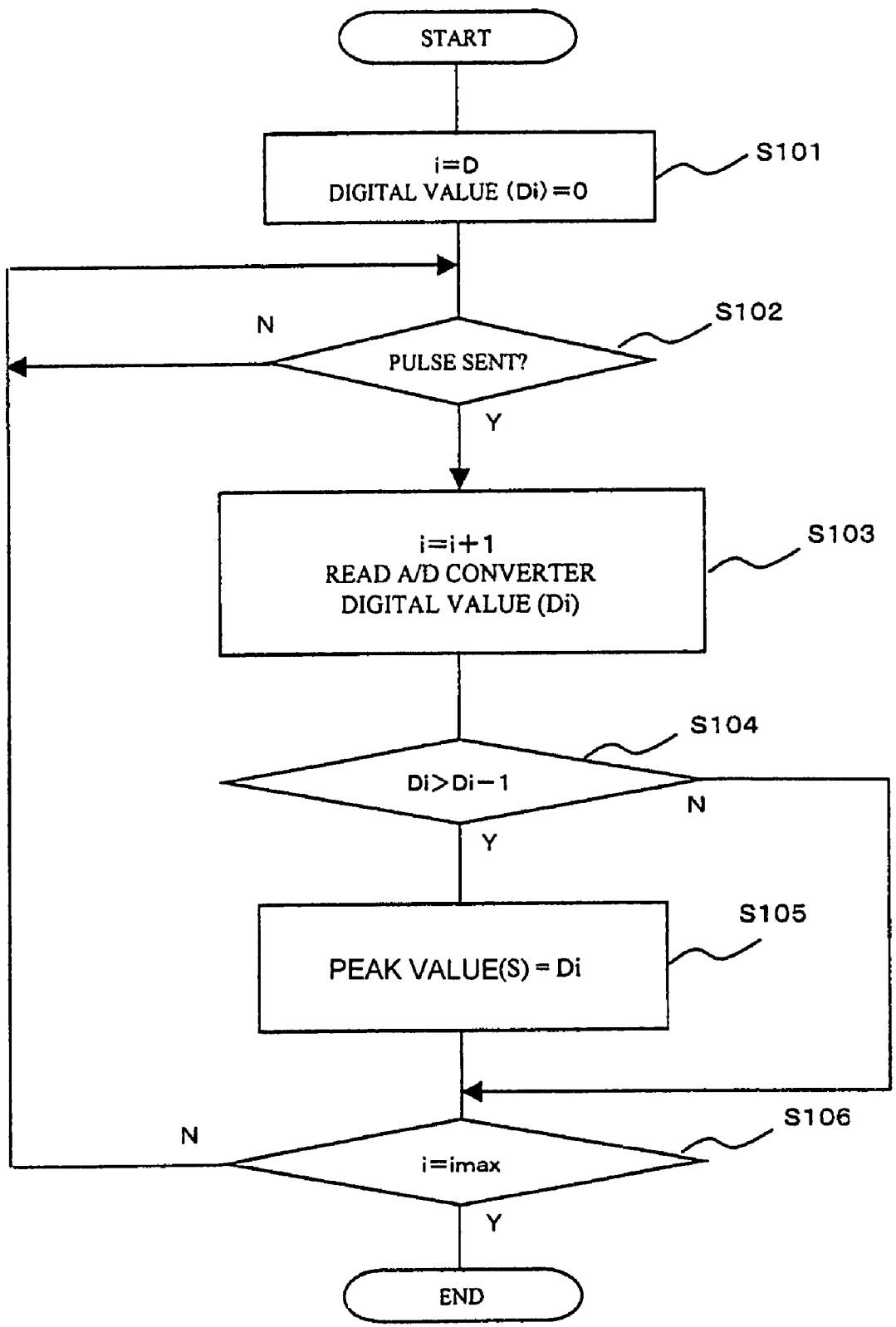
FIG. 14 is a flowchart of a peak calculating operation to be performed by the main processor of the receiver of the ultrasonic coordinate input apparatus shown in FIG. 6.

FIG. 14 is a flowchart of the peak calculating operation to be performed by the main processor 432. Through the peak calculating operation, the main processor 432 can detect the peak value of the amplitude of received ultrasonic wave. In FIG. 14, "imax" is an arbitrary value, and is determined from the time required for an ultrasonic signal to attenuate.

In step S101, the main processor 432 sets a digital value Di at 0. In step S102, the main processor 432 determines whether a pulse signal has been inputted from the comparator 439 of the ultrasonic receiver circuit 131.

In step S103, every time the main processor 432 receives a pulse signal from the comparator 439 of the ultrasonic receiver circuit 131, the main processor 432 reads the present A-D converted digital value (Di) from the ultrasonic peak detector circuit 435. In step S104, the main processor 432 compares the present A-D converted digital value with the previous A-D converted digital value. If the present A-D converted digital value is greater, the main processor 432 moves on to step S105, and determines an ultrasonic peak value S to be the digital value Di.

In step S106, the main processor 432 determines whether all the pulse determining processes have been completed. If all the pulse determining processes have not been completed yet, the main processor 432 returns to step 102, and repeats the above procedures. If all the pulse determining processes have been completed, the main processor 432 ends this operation.

Figure 15:
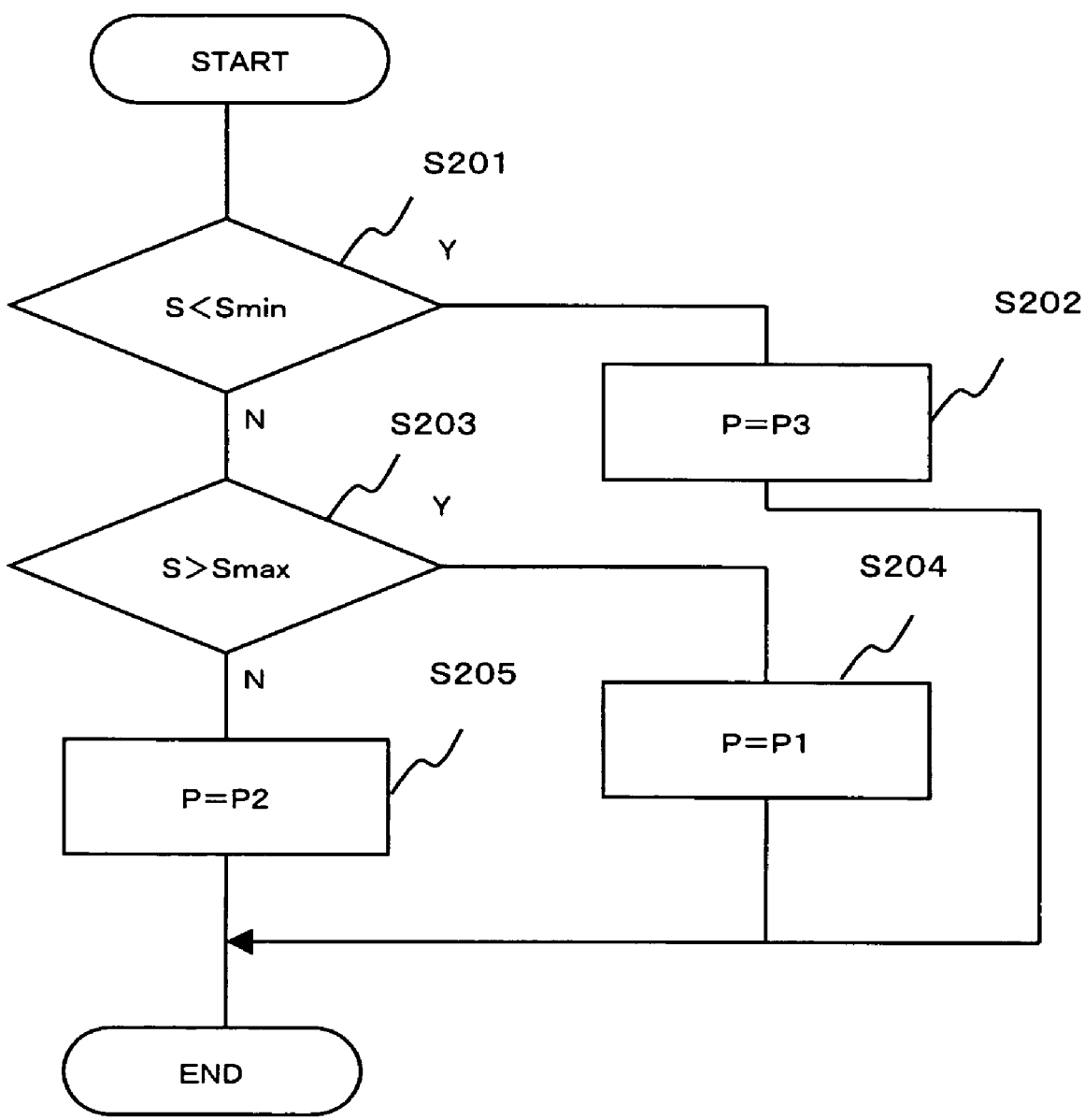
FIG. 15 is a flowchart of an ultrasonic output controlling operation to be performed by the main processor of the receiver of the ultrasonic coordinate input apparatus shown in FIG. 6.

Referring now to FIG. 15, an ultrasonic output controlling operation to be performed by the main processor 432 of the receiver 403 will be described. FIG. 15 is a flowchart of the ultrasonic output controlling operation. In FIG. 15, "S" indicates the peak value of received ultrasonic wave, "Smin" indicates the smallest possible peak value, "Smax" indicates the largest possible peak value, "P" indicates an ultrasonic output value, and "P1", "P2", and "P3" indicate ultrasonic output preset values. The relationship among the ultrasonic output preset values is expressed as: P1<P2<P3.

In step S201, the main processor 432 determines whether the ultrasonic peak value S received from the ultrasonic leak detector circuit 435 is smaller than the predetermined smallest possible peak value Smin. If the ultrasonic peak value S is smaller, the main processor 432 moves on to step S202. In step S202, the main processor 432 sets S3 to the ultrasonic output value P, so as to increase the amount of ultrasonic wave that can be outputted from the transmitter 402 and to facilitate receiving the ultrasonic wave. Here, P3 is the largest value among the three-level ultrasonic output preset values P1, P2, and P3.

If the main processor 432 determines that the ultrasonic peak value S received from the ultrasonic peak detector circuit 435 is not smaller than the predetermined smallest possible peak value Smin in step S201, the main processor 432 moves on to step S203. In step 203, the main processor 432 determines whether the ultrasonic peak value S received from the ultrasonic peak detector circuit 435 is larger than the predetermined largest possible peak value Smax. If the ultrasonic peak value S is larger, the main processor 432 moves on to step S204, and sets P1 to the ultrasonic output value P.

If the main processor 432 determines that the ultrasonic peak value S received from the ultrasonic peak detector circuit 435 is not larger than the predetermined highest peak possible value Smax in step S203, which is, if the ultrasonic peak value S is in the range that is expressed as Smin≦S≦Smax, the main processor 432 moves on to step S205, and sets P2 to the ultrasonic output value P. The main processor 432 transmits the determined ultrasonic output preset value P1, P2, or P3 to the main processor 422 of the transmitter 402 through the cable 305.

Upon receipt of the ultrasonic output preset value P1, P2, or P3 from the receiver 403, the main processor 422 of the transmitter 402 controls the ultrasonic output adjuster circuit 424 to adjust ultrasonic wave to be next outputted based on the ultrasonic output preset value. In accordance with the fourth embodiment, the ultrasonic output amplitude can be varied at several levels. Although the ultrasonic output preset value is determined by the main processor on the receiver end in the fourth embodiment, the main processor on the transmitter end may determine the ultrasonic output preset value.

Fifth Embodiment

Figure 16:
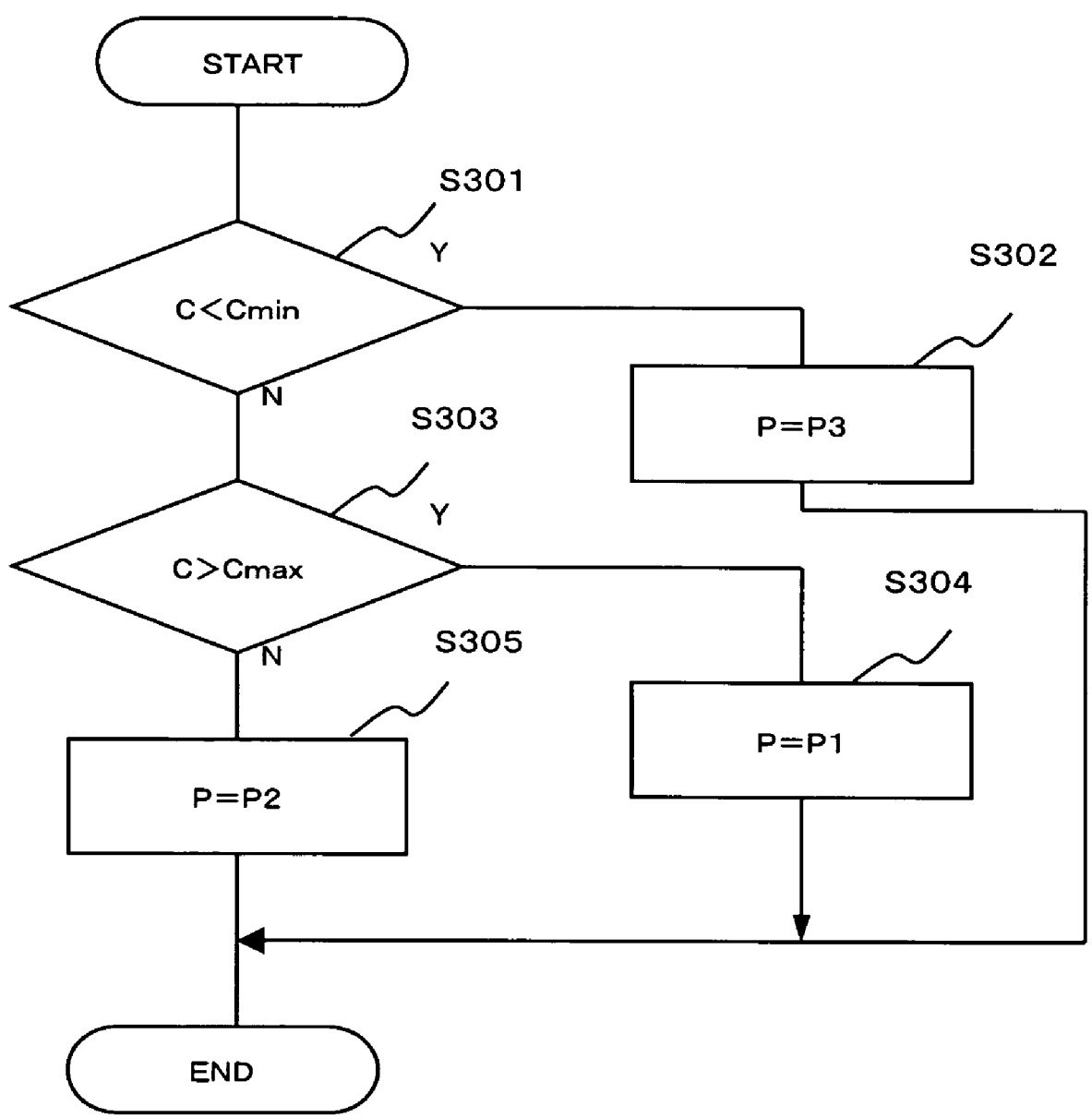
FIG. 16 is a flowchart of an ultrasonic output controlling operation of an ultrasonic coordinate input apparatus in accordance with a fifth embodiment of the present invention.

FIG. 16 is a flowchart of an ultrasonic output controlling operation of an ultrasonic coordinate input apparatus in accordance with a fifth embodiment of the present invention. As the ultrasonic coordinate input apparatus has the same structure as the structure of the fourth embodiment, the fifth embodiment will be described with reference to FIG. 6.

FIG. 16 is a flowchart of an ultrasonic output controlling operation to be performed by the main processor 432. In FIG. 16, "C" indicates the time difference (represented by a counter value) between the reception of an ultrasonic output synchronization signal and the reception of ultrasonic wave, "Cmin" indicates the smallest possible counter value, "Cmax" indicates the largest possible counter value, and "P" indicates an ultrasonic output value. In this embodiment, "P1", "P2", and "P3" indicate three-level ultrasonic output preset values. The relationship among the ultrasonic output preset values is expressed as: P1<P2<P3.

In step S301, the main processor 432 determines whether the counter value C is smaller than the predetermined smallest possible counter value Cmin. If the counter value C is smaller, the main processor 432 moves on to step S302. In step S302, the main processor 432 sets P3 to the ultrasonic output value P, so as to increase the ultrasonic wave that can be outputted from the transmitter 402.

If the main processor 432 determines that the counter value C is not smaller than the predetermined smallest possible counter value Cmin in step S301, the main processor 432 moves on to step S303. In step S303, the main processor 432 determines whether the counter value C is larger than the predetermined largest possible counter value Cmax. If the counter value C is greater, the main processor 432 moves on to step S304, and sets P1 to the ultrasonic output value P.

If the main processor 432 determines that the counter value C is not larger than the predetermined largest possible counter value Cmax in step S303, the main processor 432 moves on to step S305. In step S305, the main processor 432 sets P2 to the ultrasonic output value P, thereby controlling ultrasonic output.

In the fifth embodiment, the main processor 432 of the receiver 403 calculates the transmission time of ultrasonic wave received from the transmitter 402. Accordingly, the main processor 432 is equivalent to a transmission time calculator. In accordance with the ultrasonic wave transmission time calculated by the main processor 432 of the receiver 403, the main processor 422 of the transmitter 402 adjusts ultrasonic output to be transmitted from the ultrasonic transmitter circuit 123. Accordingly, the main processor 422 is equivalent to an output adjuster.

As described above, in accordance with the ultrasonic output amplitude pattern corresponding to the ultrasonic wave transmission time calculated by the main processor 432 of the receiver 403, the main processor 422 adjusts the ultrasonic output to be transmitted from the ultrasonic transmitter circuit 123. Accordingly, the ultrasonic output amplitude can be varied at several levels. Alternatively, the main processor 422 may directly adjust the ultrasonic output to be transmitted from the ultrasonic transmitter circuit 123, or the ultrasonic output may be adjusted through the ultrasonic output adjuster circuit 424.

Sixth Embodiment

Figure 17:
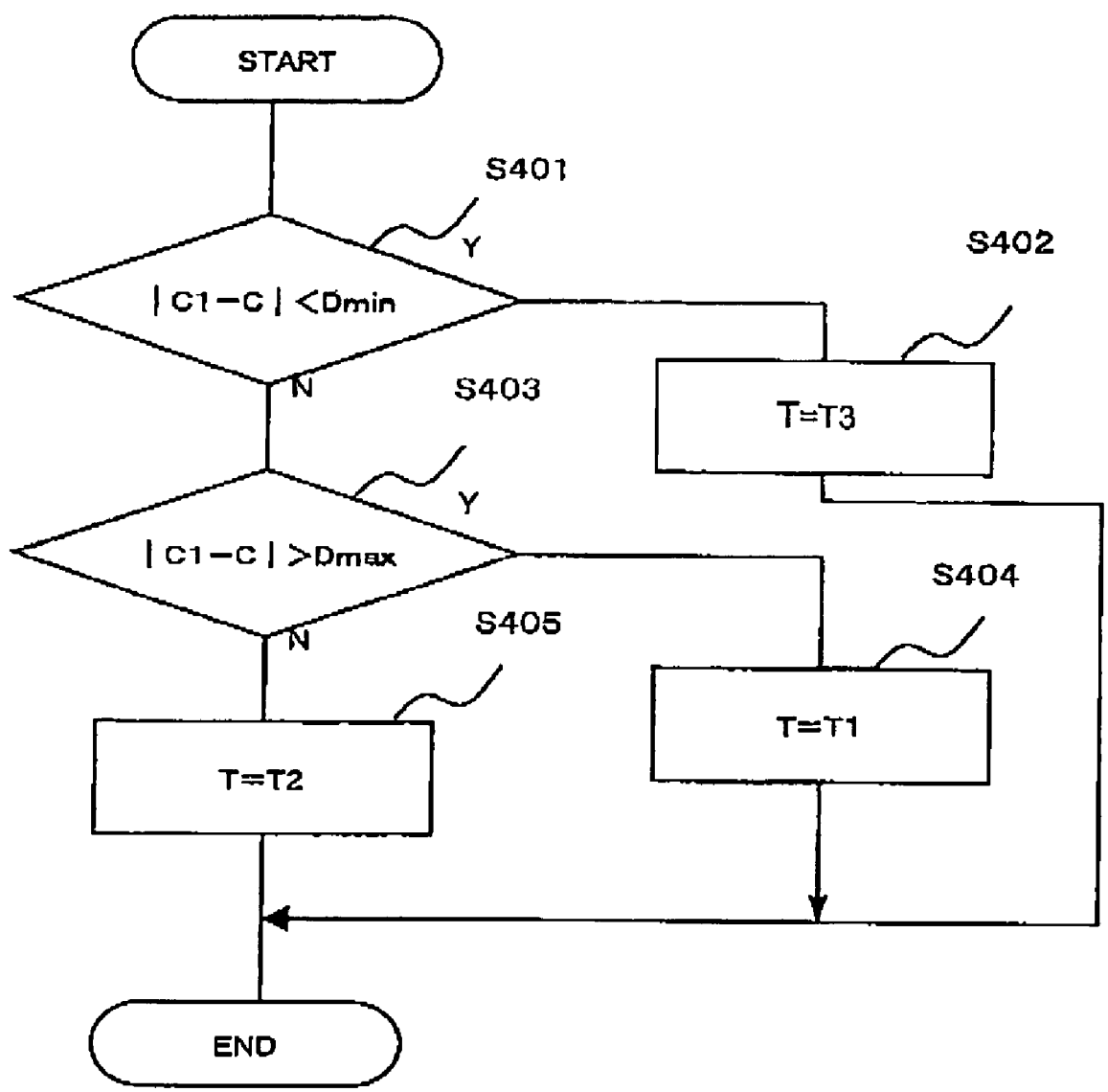
FIG. 17 is a flowchart of an ultrasonic output cycle controlling operation of an ultrasonic coordinate input apparatus in accordance with a sixth embodiment of the present invention.

FIG. 17 is a flowchart of an ultrasonic output cycle controlling operation of an ultrasonic coordinate input apparatus in accordance with a sixth embodiment of the present invention. As the ultrasonic coordinate input apparatus of this embodiment has the same structure as the structure of the fourth embodiment, this embodiment will be described with reference to FIG. 6. The sixth embodiment is characterized in that the receiver 403 gives feedback to the transmitter 402 so as to control the cycles of ultrasonic wave transmitted from the transmitter 402.

More specifically, if the main processor 432 of the receiver 403 determines that the amount of transmission from the transmitter 402 is great, the main processor 432 instructs the transmitter 402 to shorten the cycles of outputting ultrasonic wave. By doing so, the coordinate resolution can be increased, as well as the coordinate accuracy. If the main processor 432 determines that the amount of transmission from the transmitter 402 is small, the cycles of outputting ultrasonic wave are prolonged to reduce the coordinate resolution. By doing so, similar coordinate data are eliminated, and the data amount can be compressed.

In FIG. 17, "C" indicates the time difference (represented by a counter value) between the reception of an ultrasonic output synchronization signal and the reception of ultrasonic wave, "C1" indicates the previous ultrasonic wave transmission time (represented by a counter value), "Dmin" indicates the smallest possible coordinate movement value, "Dmax" indicates the largest possible coordinate movement value, "T" indicates an ultrasonic cycle value, and "T1", "T2", and "T3" indicate ultrasonic cycle preset values. The ultrasonic cycle preset values are at three levels, and the relationship among the three-level ultrasonic cycle preset values is expressed as: T1<T2<T3.

In step S401, the main processor 432 of the receiver 403 determines whether the absolute value |C1−C| of the difference between the previous ultrasonic wave transmission time C1 (represented by a counter value) and the present ultrasonic wave transmission time C (represented by a counter value) is smaller than the predetermined smallest possible coordinate movement value Dmin. If the absolute value |C1−C| is smaller than the smallest possible coordinate movement value Dmin, the main processor 432 moves on to step S402, and sets T3 to the ultrasonic cycle value T. Here, T3 is the largest value among the ultrasonic cycle preset values.

If the absolute value |C1−C| of the difference between the previous ultrasonic wave transmission time C1 (represented by a counter value) and the present ultrasonic wave transmission time C (represented by a counter value) is not smaller than the predetermined smallest possible coordinate movement value Dmin in step S401, the main processor 432 of the receiver 403 moves on to step S403.

In step S403, the main processor 432 determines whether the absolute value |C1−C| of the difference between the previous ultrasonic wave transmission time C1 (represented by a counter value) and the present ultrasonic wave transmission time C (represented by a counter value) is larger than the predetermined largest possible coordinate movement value Dmax. If the absolute value |C1−C| is larger than the largest possible coordinate movement value Dmax, the main processor 432 moves on to step S404, and sets T1 to the ultrasonic cycle value T.

If the absolute value |C1−C| of the difference between the previous ultrasonic wave transmission time C1 (represented by a counter value) and the present ultrasonic wave transmission time C (represented by a counter value) is not larger than the largest possible coordinate movement value Dmax, which is, if the absolute value |C1−C| is in the range that is expressed as Dmin≦|C1−C|≦Dmax, the main processor 432 sets T2 to the ultrasonic cycle value T.

The main processor 432 transmits the ultrasonic cycle preset value T1, T2, or T3 to the main processor 422 of the transmitter 402 through the cable 305. The main processor 432 then sets the next cycle of outputting ultrasonic wave.

In the sixth embodiment, the main processor 422 adjusts the cycles of transmitting ultrasonic wave in accordance with the ultrasonic wave transmission time calculated by the main processor 432 of the receiver 403. Here, the main processor 422 is equivalent to a cycle adjuster.

Seventh Embodiment

Figure 18:
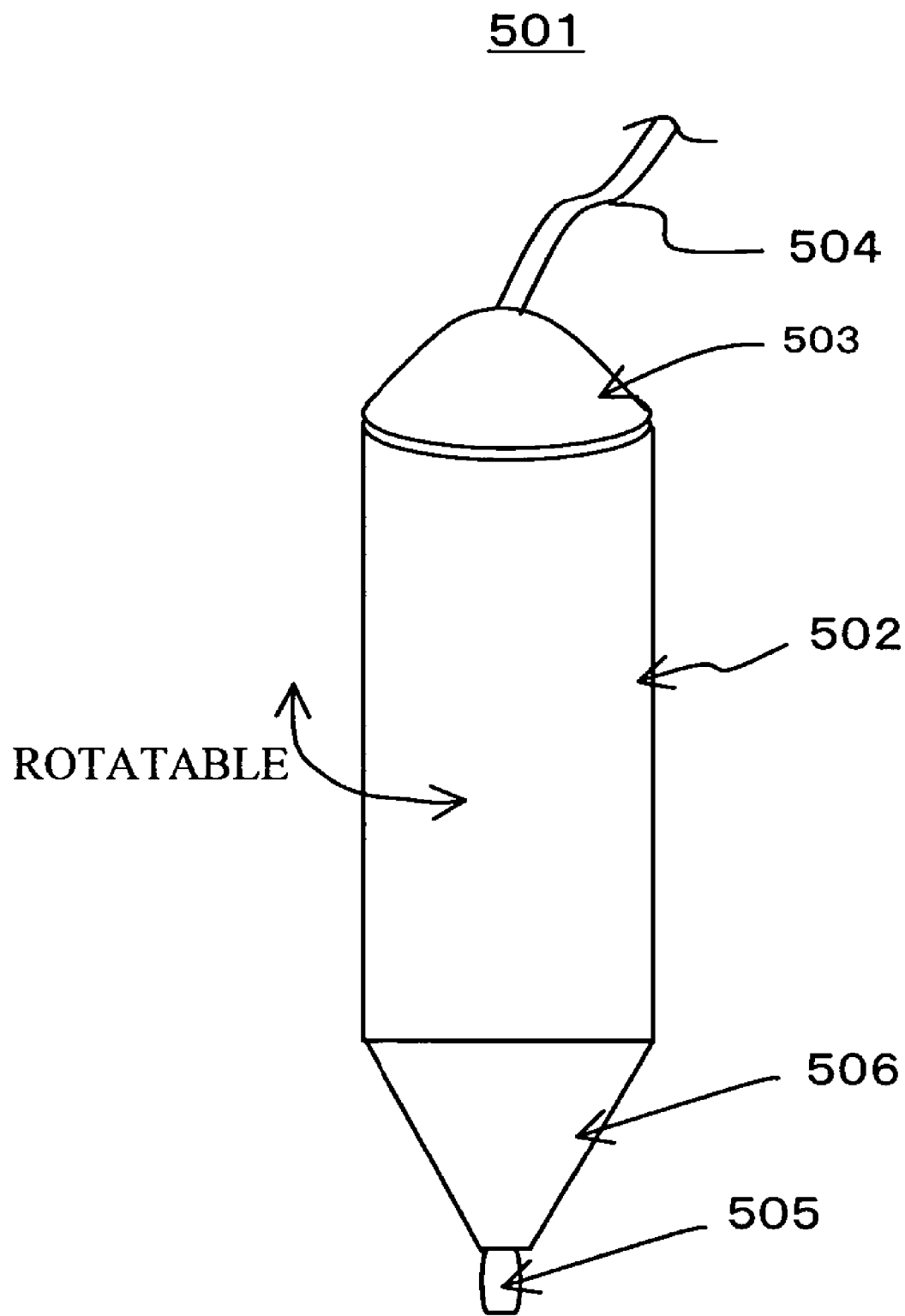
FIG. 18 illustrates the mechanical structure of a transmitter in accordance with a seventh embodiment of the present invention.
Figure 19:
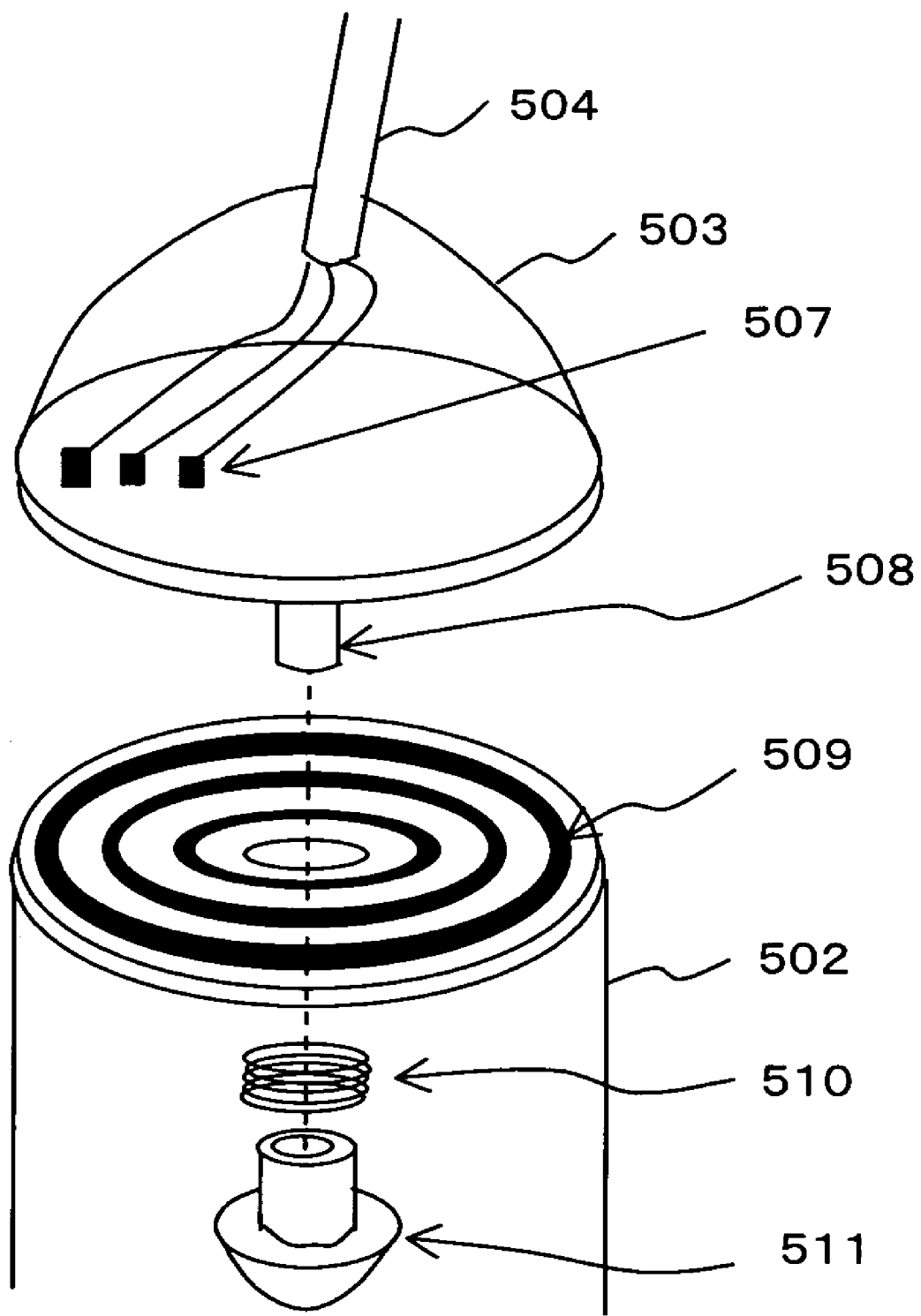
FIG. 19 is an exploded view of the transmitter in accordance with the seventh embodiment.
Figure 20:
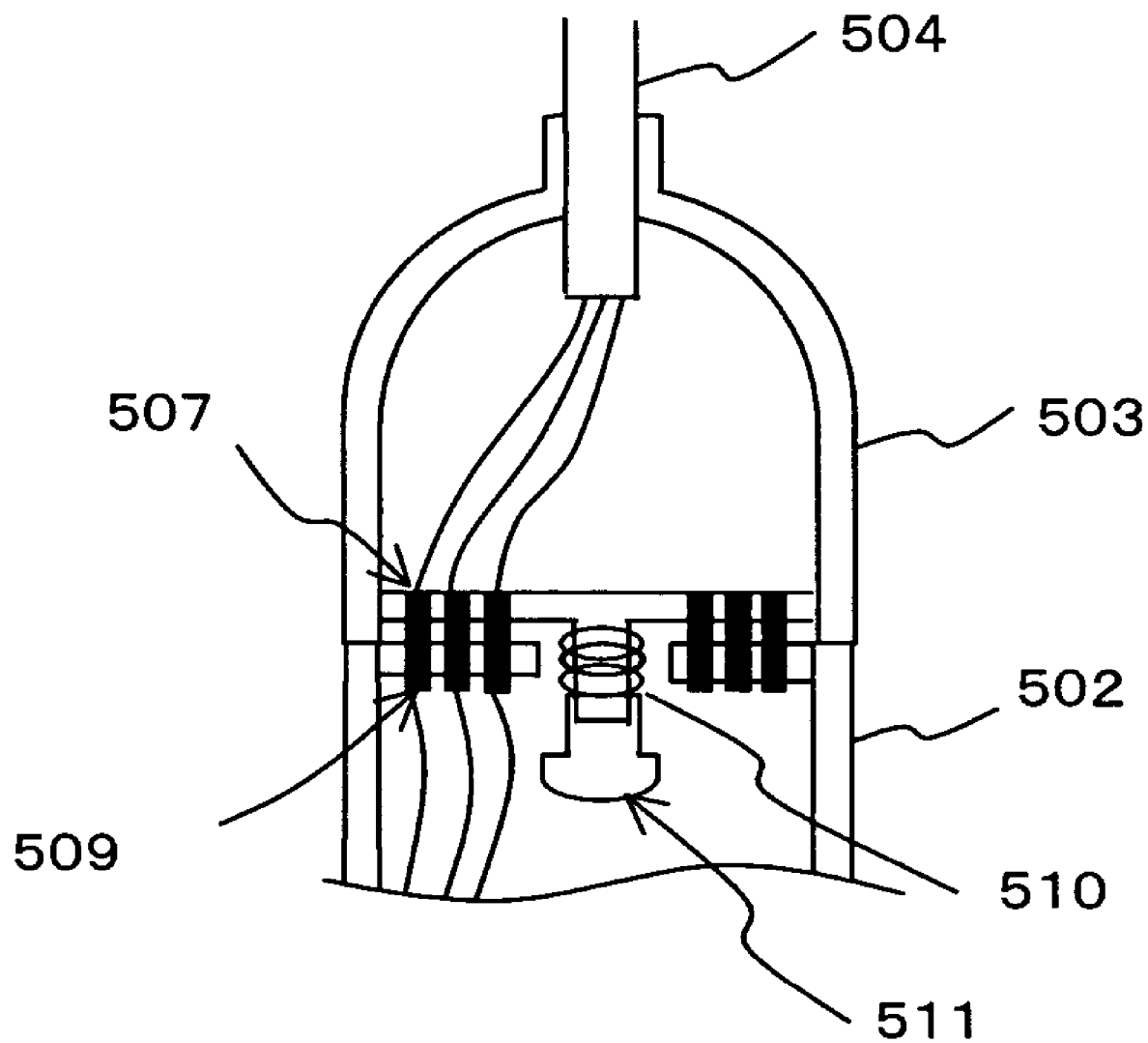
FIG. 20 is a section view of the transmitter in accordance with the seventh embodiment.

Referring now to FIGS. 18 through 20, a transmitter in accordance with a seventh embodiment of the present invention will be described. FIG. 18 illustrates the mechanical structure of the transmitter in accordance with the seventh embodiment. As shown in FIG. 18, the transmitter 501 in accordance with the seventh embodiment takes the form of a pen. Reference numeral 502 indicates a main body, reference numeral 503 is a head unit, reference numeral 504 indicates a cable, reference numeral 505 indicates a pen point, and reference numeral 506 indicates an ultrasonic output sensor.

In the transmitter 501 in accordance with the seventh embodiment, the cable 504 connecting the transmitter 501 to a receiver is designed not to twist. More specifically, the transmitter 501 has the main body 502 separated from the head unit 503. The main body 502 is designed to rotate about the center axis of the head unit 503.

FIG. 19 is an exploded view of the transmitter 501 in accordance with the seventh embodiment. FIG. 20 is a section view of the transmitter 501 in accordance with the seventh embodiment. In FIGS. 19 and 20, reference numeral 507 indicates upper contact points, reference numeral 508 indicates a head shaft, reference numeral 509 indicates lower contact points, reference numeral 510 indicates a spring, and reference numeral 511 indicates a machine screw. The head unit 503 has the upper contact points 507 for transmitting signals from the cable 504 to the main body 502. The upper contact points 507 are in contact with the lower contact points 509. The head unit 503 and the main body 502 are connected to each other with the head shaft 508 that is inserted into the main body 502 and secured by the spring 510 and the machine screw 511.

In the transmitter 501 in accordance with the seventh embodiment, the main body 502 can rotate about the center axis of the head unit 503. Thus, the cable 504 can be prevented from twisting.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An ultrasonic coordinate input apparatus comprising:
a transmitter capable of transmitting an ultrasonic wave; and
a receiver detecting a position, based on the ultrasonic wave received from the transmitter, while synchronizing with the transmitter,
the transmitter is connected to the receiver with a communication line via which the transmitter and the receiver bi-directionally communicate with each other,
the receiver comprising a transmission time calculator that calculates a time required for ultrasonic wave transmission from the transmitter to the receiver, and
the transmitter comprising a cycle adjuster that adjusts a cycle of transmitting the ultrasonic wave in accordance with a relation between a comparison of a first time difference and a second time difference and a predetermined coordinate movement value,
a time difference being defined as a difference between a time of reception of a transmitted ultrasonic wave and a time of reception of a synchronization signal.

2. The apparatus according to claim 1, wherein, upon a result of the comparison being a value less than a predetermined minimum coordinate movement, adjusting the cycle to a largest value of preset values.

3. The apparatus according to claim 1, wherein, upon a result of the comparison being a value greater than a predetermined maximum coordinate movement, adjusting the cycle to a smallest value of preset values.

4. An ultrasonic coordinate input method in which a position indicated by a transmitter that transmits an ultrasonic wave is detected based on the ultrasonic wave received from the transmitter that is in synchronization with a receiver, the method comprising:
connecting the transmitter to the receiver with a communication line;
bi-directionally communicating signals between the transmitter and the receiver via the communication line;
calculating a transmission time of the ultrasonic wave received from the transmitter;
adjusting a cycle of a next transmission of the ultrasonic wave in accordance with a relation between a comparison of a first time difference and a second time difference and a predetermined coordinate movement value,
a time difference being defined as a difference between a time of reception of a transmitted ultrasonic wave and a time of reception of a synchronization signal.

5. The method according to claim 4, wherein the first time difference is for a previous ultrasonic wave transmission.

* * * * *

UNITED STATES PATENT AND TRADEMARK OFFICE
CERTIFICATE OF CORRECTION

PATENT NO. : 7,760,194 B2  Page 1 of 1
APPLICATION NO. : 10/851229
DATED : July 20, 2010
INVENTOR(S) : Satoshi Sakurai It is certified that error appears in the above-identified patent and that said Letters Patent is hereby corrected as shown below:

Title Page, Column 1, item "(73)", change "Fujtisu" to --Fujitsu--.

Signed and Sealed this

Thirtieth Day of November, 2010

David J. Kappos
*Director of the United States Patent and Trademark Office*